(12) United States Patent
Martino-Gonzalez et al.

(10) Patent No.: US 11,377,190 B2
(45) Date of Patent: Jul. 5, 2022

(54) METHOD FOR MANUFACTURING A REAR SECTION OF AN AIRCRAFT AND AIRCRAFT REAR SECTION MANUFACTURED BY SAID METHOD

(71) Applicant: AIRBUS OPERATIONS S.L., Madrid (ES)

(72) Inventors: Esteban Martino-Gonzalez, Aranjuez (ES); Alberto Arana Hidalgo, Madrid (ES); Melania Sanchez Perez, Madrid (ES); Carlos Garcia Nieto, Pinto (ES); Jesus Javier Vazquez Castro, Getafe (ES); Edouard Menard, Madrid (ES); Fernando Iniesta Lozano, Madrid (ES); Maria Almudena Canas Rios, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 460 days.

(21) Appl. No.: 16/440,317

(22) Filed: Jun. 13, 2019

(65) Prior Publication Data
US 2019/0382136 A1  Dec. 19, 2019

(30) Foreign Application Priority Data
Jun. 19, 2018 (EP) ..................... 18382441

(51) Int. Cl.
*B64C 1/06* (2006.01)
*B64F 5/10* (2017.01)
(Continued)

(52) U.S. Cl.
CPC ............ *B64C 1/0685* (2020.01); *B64C 1/061* (2013.01); *B64C 1/064* (2013.01); *B64C 1/12* (2013.01); *B64C 5/02* (2013.01); *B64F 5/10* (2017.01)

(58) Field of Classification Search
CPC ......... B64C 1/0685; B64C 1/06; B64C 1/061; B64C 1/064; B64C 2001/007; B64F 5/10
See application file for complete search history.

(56) References Cited

U.S. PATENT DOCUMENTS 4,292,101 A    9/1981  Reichert
5,242,523 A *  9/1993  Willden ............ B29D 99/0014
                                                156/285
(Continued)

FOREIGN PATENT DOCUMENTS

WO    2014/070381    5/2014

OTHER PUBLICATIONS

European Search Report cited in EP 18 3 8 2441 completed Nov. 6, 2018, 2 pages.

*Primary Examiner* — Timothy D Collins
*Assistant Examiner* — Justin Michael Heston
(74) *Attorney, Agent, or Firm* — Nixon & Vanderhye P.C.

(57) ABSTRACT

A method for manufacturing an aircraft rear section including a tail cone and a vertical tail plane, the method includes: providing pre-cured frames (1) each of which includes a section of the tail cone (2) and a section of the vertical tail plane (3); providing pre-cured stringers (4); placing the pre-cured stringers (4) each in respective positions within the pre-cured frames (1); placing a skin (5) around an external surface of the pre-cured frames (1); and curing the pre-cured frames (1), the pre-cured stringers (4), and the skin (5), forming the final aircraft rear section.

16 Claims, 3 Drawing Sheets

(51) Int. Cl.
*B64C 1/12* (2006.01)
*B64C 5/02* (2006.01)

(56) References Cited

U.S. PATENT DOCUMENTS

| | | |
|---|---|---|
| 5,908,175 A | 6/1999 | Magnes |
| 9,050,757 B1* | 6/2015 | Boone .................... B32B 37/10 |
| 9,302,455 B1* | 4/2016 | Boone .................... B32B 37/02 |
| 9,649,820 B1* | 5/2017 | Boone .............. B29C 66/73751 |
| 2006/0108058 A1* | 5/2006 | Chapman .............. B29C 70/386 |
| | | 156/245 |
| 2011/0052845 A1 | 3/2011 | Dermond |
| 2012/0001023 A1* | 1/2012 | Arevalo .................. B64C 1/064 |
| | | 244/119 |

* cited by examiner

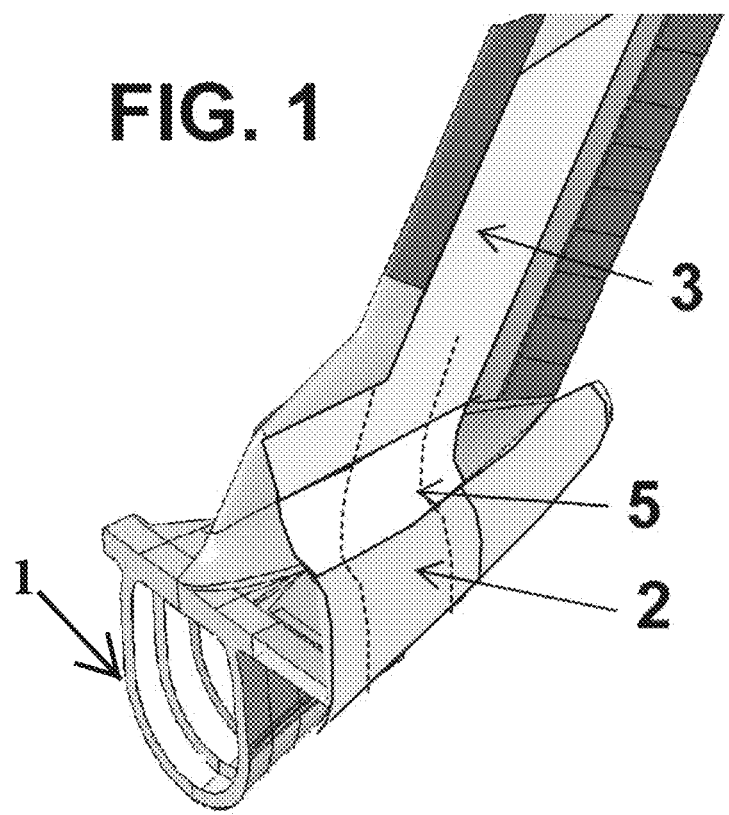

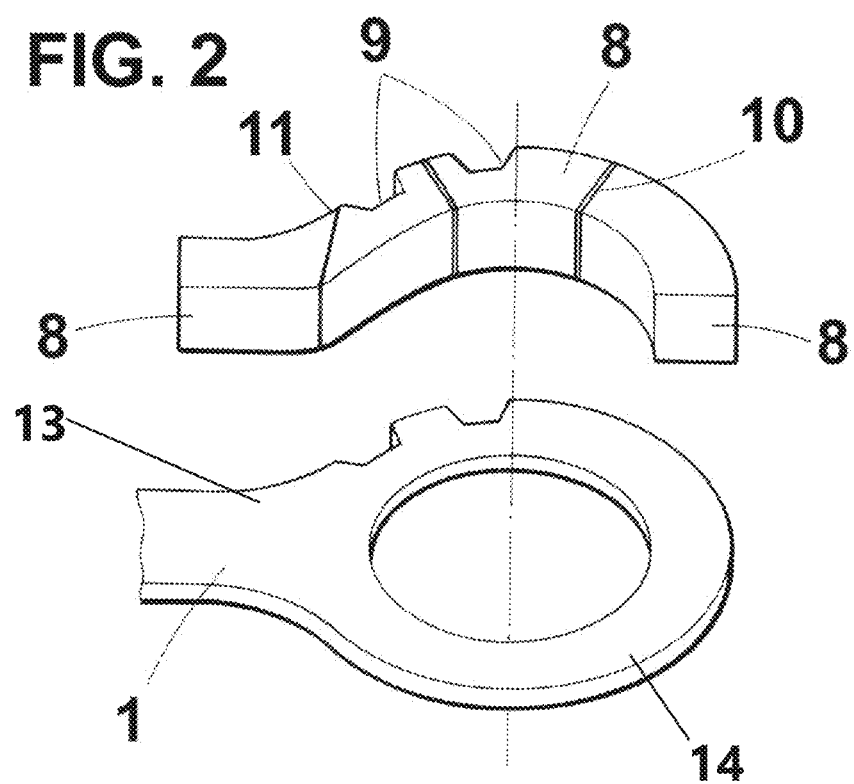

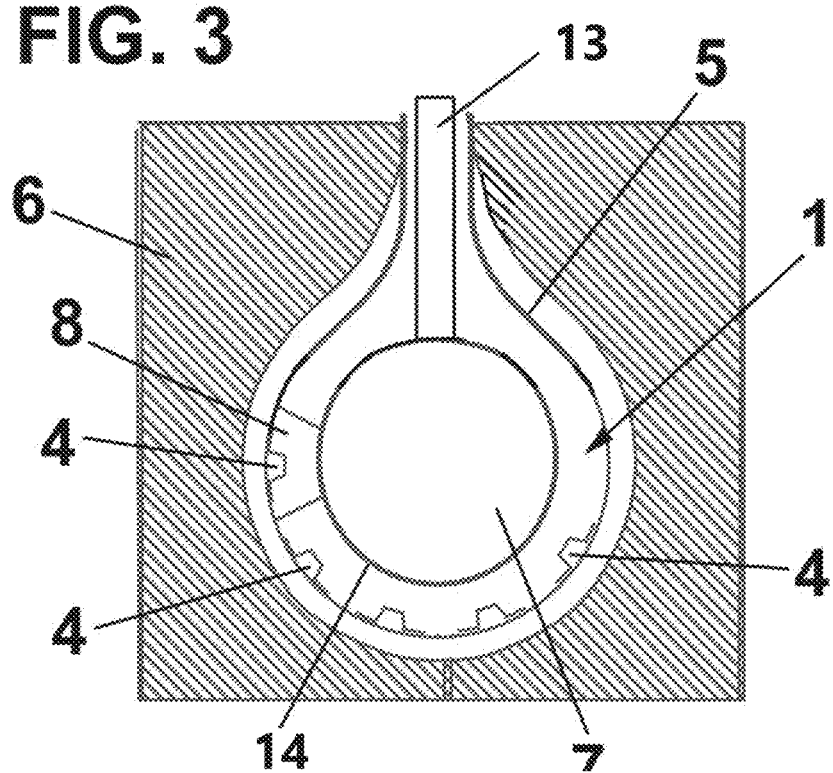

METHOD FOR MANUFACTURING A REAR SECTION OF AN AIRCRAFT AND AIRCRAFT REAR SECTION MANUFACTURED BY SAID METHOD

RELATED APPLICATION

This application claims priority to European Patent Application 18382441-6, filed Jun. 19, 2018, the entirety of which is incorporated by reference.

FIELD OF THE INVENTION

The present invention refers to a method for manufacturing a rear section of an aircraft, particularly for manufacturing the tail cone and the vertical tail plane of an aircraft at the same time. The present invention also refers to the aircraft rear section manufactured by said method.

BACKGROUND OF THE INVENTION

Conventionally, to build an aircraft fuselage, a series of frames in the shape of the fuselage cross sections are held in position on a rigid fixture. These frames are then joined with the fuselage skin panels that includes lightweight longitudinal elements called stringers that increase the buckling resistance of the skin. The stringers are attached to the skin by means of riveting, by cured resin or by bonding with special adhesives. The junction of the skin panels and the frames is performed by means of angular interface parts called shear ties that joint the frame web and the fuselage skin, to conform the complete fuselage. In some cases, these angular parts can be part of the frame as an integrated flange.

The vertical tail plane, also known as empennage, is conventionally formed by a structural primary torsion box, a leading, a trailing edge and a movable surface. The primary box is formed by a skin, two or more spars and internal ribs. When the number of spars is sufficient, total of part of the ribs could be removed.

In known aircrafts, the junction between the vertical tail plane and the fuselage rear section is an interface of fittings to form the tail cone section. The interface fittings transfer the continuum loads distribution on the skins of the torsion box of the empennage to punctual loads that are transferred to the frames of the fuselage. Frames distribute the load to the fuselage skin.

The loads at the interface fittings are very high because they concentrate on punctual areas of the structure. The high loads requires to significant reinforcements, and the reinforcements add weight to the interface fittings and surrounding elements of the tail cone section. Additionally, the interface fittings need to be covered by aerodynamic fairing that produces significant penalty of aerodynamic drag. In addition, the assembly of these components is time consuming.

SUMMARY OF THE INVENTION

In view of the concerns regarding the conventional interface fittings and time consuming construction of conventional aircraft tail sections, an invention has been made and is disclosed herein which may be embodied as a new assembly of an aircraft empennage including at least the tail cone section and the vertical tail plane (and additionally the horizontal tail plane) with a continuous skin covering the tail cone section and the vertical tail plane.

The invention may include, for certain aircraft configurations with rear fuselage mounted engine, an integrated shield in the vertical tail plane to stop potential debris crossing between engines.

In a discrete interface, some level of failure is required to be considered for safety purposes, so that the overall efficiency of the union is reduced. In contrast to a discrete interface, the invention integrates the tail cone and vertical tail plane.

The invention may be embodied as a method for manufacturing a rear section of an aircraft, for integrating the tail cone and the vertical tail plane with a continuous skin solution, creating a manufacturing method in one shot, so that the operation of joining two major components in final assembly is removed, reducing the costs of assembly.

With the method and aircraft rear section according to the present invention, it is possible to improve on said drawbacks, providing other advantages that are described below.

The invention may be embodied as a method for manufacturing a rear section of an aircraft, said rear section comprising a tail cone and a vertical tail plane, which comprises the following steps:

(i) providing a plurality of pre-cured frames, each pre-cured frame comprising a section of the tail cone and a section of the vertical tail plane;

(ii) providing a plurality of pre-cured stringers;

(iii) placing said plurality of pre-cured stringers in their position in the pre-cured frames;

(iv) placing a skin around the external surface of the pre-cured frames; and (v) curing the pre-cured frames, the pre-cured stringers, and the skin, forming the final aircraft rear section.

The use of material such as thermoplastic permits several curing cycles.

The curing step may be carried out applying an internal pressure, for example by an expandable chamber placed inside the tail cone sections.

For permitting the disassembly in several parts and a local redesign, the pre-cured stringers are preferably provided in modules.

The curing step may use a mold, wherein said mold is preferably provided with internal modular molds, and also external said mold being made from two mold halves, providing smooth surface on aerodynamic side.

Furthermore, said plurality of pre-cured stringers are preferably placed in their position also in the modular molds.

If necessary, the method for manufacturing a rear section of an aircraft can also comprise a pre-curing step for pre-curing said skin.

The invention may be embodied as an aircraft rear section manufactured with the method as disclosed previously, said aircraft rear section comprising a tail cone and a vertical tail plane, which is characterized in that the aircraft rear section also comprises an external continuous skin that joins the tail cone and the vertical tail plane.

The external continuous skin may be made of a thermoplastic material, even though it could be made from any suitable material.

The method and the aircraft rear section according to the present invention has at least the following advantages:

The loads are not transferred only to discrete points, but the loads transferred are continuously supported by frames and skin.

A transition surface between fuselage conic cylinder and the vertical tail cone profile allows a smooth transition between those surfaces so that the vertical tail cone skin loads can pass directly to the fuselage skin on a continuous manner, not needing to use conventional interface fittings and frames.

The junction of components is easier because of the reduction in number of components and junctions.

Weight reduction because of the removal of the fittings in the tail cone and in the vertical tail plane and the removal of the fairings, It permits a shielding manufacturing and assembly simplification because of less elements and riveted interfaces in continuous skin concept.

An advantage of the method is to remove or simplify an assembly between two major components typically performed in the last stages of the A/C assembly. At this stage since all parts are produced the capital immobilized is large and any lead time reduction is an important cost saving.

Fairings can be a problem for acoustic fatigue, vibration and debris release in case of engine debris impact. The present invention eliminates this problem because these fairings are reduced.

The continuous skin reduces the punctual load transmitted to the frame. This allows to reduce dimensions constraints on the frames due to the integration of such fittings. As a result, optimization of the frame height and thickness is possible, resulting on a weight reduction.

SUMMARY OF THE DRAWINGS

For a better understanding the above explanation and for the sole purpose of providing an example, some non-limiting drawings are included that schematically depict a practical embodiment.

FIG. 1 is a perspective view of an aircraft rear section, which embodies the invention FIG. 2 is diagrammatical perspective view of an exemplary mold that may used in a method embodying the invention; and FIG. 3 is a diagrammatical drawing of the final step of the manufacturing method according to the present invention.

DETAILED DESCRIPTION OF THE INVENTION

FIG. 1 is a perspective view of the aircraft rear section according to the present invention, manufactured with the method described previously.

As shown in this figure, this aircraft rear section comprises a tail cone 2 (made from tail cone sections) and a vertical tail plane 3 (made from vertical tail plane sections), and an external continuous skin 5, which may be made from a thermoplastic material, that joins the tail cone 2 and the vertical tail plane 3.

As shown in FIG. 2, a set of internal modular molds 8 are provided, on which pressure is applied by the expandable chamber 7. Compaction is provided to the external skin 5 between these internal molds 8 and the mold 6, which is external.

The modular molds 8 are used for positioning the pre-cured frames 1 between the modular molds 8.

As shown in this FIG. 2, there are a plurality of cut-outs 9 in the pre-cured frame 1 and in at least one modular mold 8 for placing the pre-cured stringers 4, and a joint 10 between two adjacent modular molds 8. The joints 10 permit thermal expansion of the mold during curing and allow the mold to be removed from the molded assembly after curing.

Furthermore, at least one of the modular molds 8 comprises an oblique slit 11 for permitting dismantling of the final product once cured.

In the closed mold 6, the internal structure formed by a plurality of modular molds 8 maintained together by thermal expansion and the expandable chamber 7.

FIG. 3 is diagrammatical drawing of a pre-cured frame 1 placed inside a mold during the final step of the method for manufacturing the rear section of an aircraft according to the present invention, as will be described hereinafter.

In the method according to the present invention first are provided a plurality of pre-cured frames, generally identified by numeral reference 1, each pre-cured frame 1 comprising a section 14, e.g., an annular ring, of the tail cone 2 and a section 13, e.g., a beam, of the vertical tail plane 3.

In this method a plurality of pre-cured stringers 4 is also provided and said plurality of pre-cured stringers are placed in their position in the pre-cured frames. The pre-cured frames and pre-cured stringers may be formed of a composite carbon fiber material infused with a resin during a pre-curing process.

The pre-cured frames 1 are then assembled vertically and an external skin 5 is placed around the external surface of the pre-cured frames 1.

The position of the pre-cured stringers 4, preferably provided in modules, is shown in FIG. 1.

Finally, the pre-cured frames 1, the pre-cured stringers 4, and the external skin 5 are placed inside a mold 6, which can be made from two mold halves, and the pre-cured frames 1, the pre-cured stringers 4, and the external skin 5 are cured forming the final aircraft rear section.

During this curing step, an internal pressure is provided inside the tail cone sections 14, for example, by an internal expandable chamber 7.

Before the curing step, if desired, the external skin 5 can be pre-cured.

FIG. 1 is a perspective view of the aircraft rear section according to the present invention, manufactured with the method described previously.

As shown in this figure, this aircraft rear section comprising a tail cone 2 (made from said tail cone sections 14) and a vertical tail plane 3 (made from said vertical tail plane sections 13), and an external continuous skin 5, which is preferably made from a thermoplastic material, that joins the tail cone 2 and the vertical tail plane 3.

Even though reference has been made to a specific embodiment of the invention, it is obvious for a person skilled in the art that the method and the aircraft rear section described herein are susceptible to numerous variations and modifications, and that the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method to mold a rear section of an aircraft comprising:
arranging pre-cured frames at intervals along a longitudinal axis of the rear section, wherein each of the pre-cured frames includes an annular section which forms a portion a tail cone of the rear section and a beam which forms a portion of a vertical tail plane of the rear section;
mounting pre-cured stringers in notches in a perimeter of the annular section of the pre-cured frames, wherein the pre-cured stringers each span a plurality of the pre-cured frames;
covering with a skin the perimeter of the annular section and opposite sides of the beam of the pre-cured frames, and the pre-cured stringers in the notches of the annular section, wherein the skin forms a continuous skin covering the tail cone and at least a portion of the vertical tail plane;
enclosing an assembly of the pre-cured frames and the pre-cured stringers in a modular mold; and
curing the assembly in the modular mold to form the rear section.

2. The method according to claim 1, wherein the step of arranging the pre-cured frames includes arranging each of the pre-cured frames in a vertical orientation and providing separation between each of the pre-cured frames.

3. The method according to claim 1, wherein said curing step includes applying an internal pressure to the assembly.

4. The method according to claim 3, wherein the internal pressure is applied by an expandable chamber placed inside the tail cone sections of the pre-cured frames.

5. The method according to claim 1, wherein the pre-cured stringers are provided in modules.

6. The method according to claim 1, wherein the curing step includes placing the entire assembly in the modular mold and curing the entire assembly in the modular mold.

7. The method according to claim 6, wherein said modular mold includes two half molds.

8. The method according to claim 1, wherein the modular mold includes an external mold surrounding the assembly and modular internal molds positioned between adjacent ones of the pre-cured frames.

9. The method according to claim 8, further comprising placing the pre-cured stringers each at a respective position in the modular mold.

10. The method according to claim 1, further comprising pre-curing the skin for the rear section, before the step of placing the skin around the external surfaces of the pre-cured frames.

11. The method of claim 1, further comprising inserting molds between the pre-cured frames, wherein each of the molds includes an annular section, a beam, and notches are configured to receive the pre-cured stringers.

12. The method of claim 11, wherein the pre-cured frames are each a unitary, single piece component, and each of the annular sections of the molds is an assembly of at least two mold segments.

13. The method of claim 12, wherein the at least two mold segments are separated along a plane oblique to the longitudinal axis of the tail section.

14. The method of claim 12, further comprising inserting an expandable chamber into a hollow portion of the annular sections of the molds and the pre-cured frames, and expanding the expandable chamber during the curing step.

15. An aircraft rear section comprising:
frames oriented in planes perpendicular to a longitudinal axis of the aircraft rear section and spaced from each other along the longitudinal axis, wherein each of the frames include an annular section forming a portion of a tail cone and a beam forming a portion of a vertical tail plane;
stringers spanning a plurality of the frames and arranged in notches in a perimeter of the annular section of each of the frames, and
an external continuous skin covering the perimeters of the annular section of the frames, opposite sides of the beams of the frames and the stringers.

16. The aircraft rear section according to claim 15, wherein the external continuous skin is formed of a thermoplastic material.

* * * * *